May 17, 1955     J. H. STAAK     2,708,723
MACHINE BRUSHHOLDER
Filed June 20, 1952
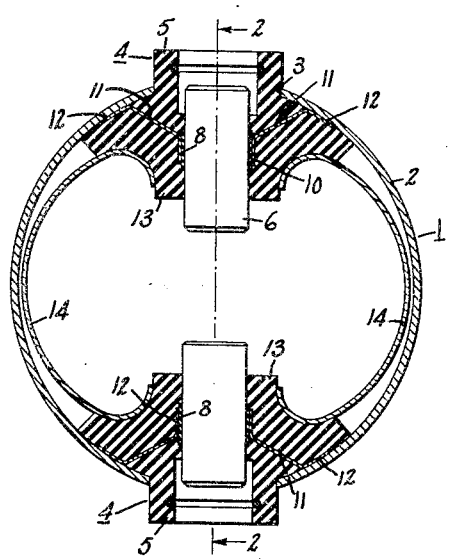
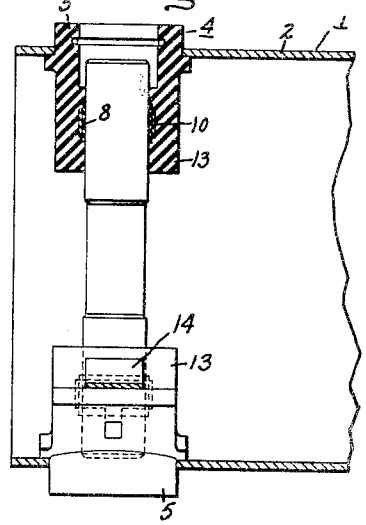
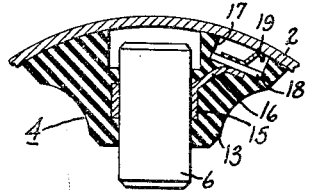
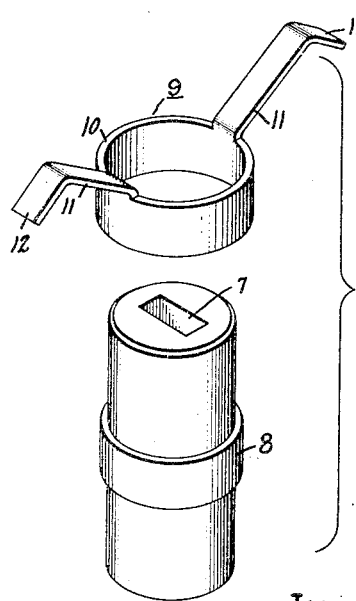
Inventor:
Julius H. Staak,
by *Powell S. Mack*
His Attorney.

United States Patent Office 2,708,723
Patented May 17, 1955

2,708,723

MACHINE BRUSHHOLDER

Julius H. Staak, Fort Wayne, Ind., assignor to General Electric Company, a corporation of New York Application June 20, 1952, Serial No. 294,541

4 Claims. (Cl. 310—239)

This invention relates to dynamoelectric machines and more particularly to such machines having means for radio interference elimination.

In the design of commutator type dynamoelectric machines, particularly small motors utilized in aircraft applications, it is desirable to incorporate means for eliminating radio interference. Since the radio interference is produced by commutation, it is customary to connect a capacitor between the brushholders and ground in order to provide a low impedance path for the high frequency current which causes the interference. Since many aircraft motors are of extremely small size, it is desirable integrally to incorporate the radio interference capacitor in the brushholder assembly and to eliminate the soldered connections ordinarily used to connect the capacitor between the brushholder and ground.

It is, therefore, an object of this invention to provide a brushholder assembly for a dynamoelectric machine incorporating a radio interference suppressing capacitor.

In accordance with one aspect of this invention, a brushholder assembly is provided arranged to be mounted within the motor shell and comprising a brushholder tube formed of conductive material. A sleeve of dielectric material surrounds the tube and is in turn surrounded by a capacitor member in the form of a sleeve formed of conductive material which forms a capacitor with the brushholder tube. The capacitor member has an extension portion contacting the shell of the machine to form the ground connection. The brushholder tube, dielectric sleeve, and capacitor member are all encased in a body of molded insulating material to provide a unitary structure. In a modified form of this invention, the brushholder tube is embraced by a sleeve member having an extension portion and these two elements are encased in a body of molded insulating material, the resultant assembly being arranged within the shell of the machine. A recess is formed in the molded body communicating with the shell and a wafer-shaped capacitor is positioned therein with a spring member forming the connection to the shell and with the tubular member extension contacting the other side of the capacitor.

Further objects and advantages of this invention will become apparent and the invention will be better understood by reference to the following description in the accompanying drawing, and the features of novelty which characterize this invention will be pointed out with particularity in the claims annexed to and forming a part of this specification.

In the drawing, Fig. 1 is a cross-sectional view of a dynamoelectric machine provided with the improved brushholder assemblies of this invention; Fig. 2 is a cross-sectional view taken along the line 2—2 of Fig. 1; Fig. 3 is an exploded view showing the brushholder tube, dielectric, and capacitor elements of my improved brushholder assembly; and Fig. 4 is a fragmentary view, partly in section, illustrating a modified form of this invention.

Referring now to Fig. 1, there is shown a dynamoelectric machine 1 having a cylindrical shell member 2 formed of conductive material with openings 3 formed therein. Brushholder assemblies 4 are arranged within shell 2 abutting the inner wall thereof, with extensions 5 thereof projecting through the shell openings 3. The brushholder assemblies 4 respectively comprise a brushholder tube 6 formed of conductive material and having a longitudinal slot 7 formed therein for longitudinally guiding a suitable brush (not shown) toward the commutator of the machine (also not shown). The brushholder tube 6 is surrounded by a sleeve 8 of dielectric material, for example a suitable ceramic. The dielectric sleeve 8 may be coated or plated with a suitable conductive material such as silver. A capacitor member 9 is provided formed of conductive material having a sleeve portion 10 surrounding the dielectric sleeve 8. A pair of arms 11 extend from the sleeve 10 with end portions 12 engaging the inner surface of the shell 2. It is thus seen that the sleeve 10 of capacitor member 9 together with the dielectric sleeve 8 forms a capacitor with the brushholder tube 6 and that the extensions 11 by contacting the shell 2 form a ground connection for the capacitor. The entire assembly including brushholder tube 6, dielectric sleeve 8, and capacitor member 9 is encased in a body 13 of suitable molded insulating material. Suitable springs 14 bias the brushholder assemblies 4 outwardly into engagement with the inner surface of the shell 2.

Referring now to Fig. 4, there is shown a modified form of this invention wherein brushholder assembly 4 is again mounted within a cylindrical shell member 2 abutting the inner wall thereof. Here, brushholder tube 6 formed of conductive material is embraced by a sleeve 15 also formed of conductive material having an extension portion 16. The sleeve 15 is similar in appearance to the member 9 of Fig. 3, however, with only one extension portion formed thereon. The brushholder 6 and the sleeve 15 are encased in a body of molded insulating material 13. Recess 17 is formed in the outer periphery of the molded body 13 communicating with the inner surface of the shell 2 and a suitable capacitor 18 is arranged therein. The capacitor 18 may be a ceramic wafer suitably plated, as with silver, on both sides. A spring member 19 holds the capacitor 18 in the recess 17 and connects the capacitor to the shell 2. The extension portion 16 of the sleeve member 15 in turn communicates with the recess 17 and contacts the other side of the capacitor 18.

It will now be seen that this invention provides an improved brushholder assembly having a grounding capacitor integrally formed therewith eliminating the necessity for making soldered connections normally used to connect the radio interference capacitor from the brushholder to the frame of the machine.

While I have shown and described a particular embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim as new and desire to secure by Letters Patent of the United States:

1. In a dynamoelectric machine, a frame, and a brushholder assembly positioned within said frame comprising a brushholder tube member formed of conductive material, said brushholder tube member having a dielectric formed on its outer surface, a unitary capacitor member embracing said brushholder tube member forming a capacitor therewith and having an arm portion contacting said frame forming a ground connection, a body of insulating material encasing said members, and means for biasing said body against said frame, said arm portion being arranged to extend through said body so as to be maintained thereby in grounding connection with said frame.

2. In a dynamoelectric machine, a frame and a brushholder assembly positioned within said frame and abutting the inner wall thereof comprising a brushholder tube member formed of conductive material, a sleeve member formed of dielectric material surrounding said brushholder tube member, a unitary capacitor member formed of conductive material having a portion embracing said sleeve member forming a capacitor with said brushholder tube member and having an outer portion contacting said frame forming a ground connection, a body of insulating material encasing said members and having a portion thereof projecting through said frame, and means for biasing said body against said frame, said outer portion being arranged to extend through said body so as to be maintained thereby in grounding connection with said frame.

3. In a dynamoelectric machine, a shell, and a brushholder assembly positioned within said shell and abutting the inner wall thereof comprising a brushholder tube member formed of conductive material, a sleeve member formed of dielectric material surrounding said brushholder tube member, a unitary capacitor member formed of conductive material having a portion surrounding said sleeve member forming a capacitor with said brushholder tube member and having an outer portion contacting said shell forming a ground connection, a body of molded insulating material encasing said members, and means for biasing said body against said shell, said outer portion being arranged to extend through said body so as to be maintained thereby in grounding connection with said shell.

4. In a dynamoelectric machine, a shell, and a brushholder assembly positioned within said shell and abutting the inner wall thereof comprising a brushholder tube member formed of conductive material, a sleeve member formed of dielectric material surrounding said brushholder tube member, a unitary capacitor member formed of conductive material having a sleeve portion surrounding said sleeve member forming a capacitor with said brushholder tube member, said sleeve portion having an extension contacting said shell forming a ground connection, a body of molded insulating material encasing said members and having a portion thereof projecting through said shell, and means for biasing said body against said shell, said extension being arranged to extend through said body so as to be maintained thereby in grounding connection with said shell.

References Cited in the file of this patent

UNITED STATES PATENTS

| | | |
|---|---|---|
| 1,926,441 | Gilbert | Sept. 12, 1933 |
| 2,391,005 | Bryan | Dec. 18, 1945 |
| 2,450,809 | Nader | Oct. 5, 1948 |
| 2,453,114 | Brandt | Nov. 9, 1948 |
| 2,457,525 | Brian | Dec. 28, 1948 |

FOREIGN PATENTS

| | | |
|---|---|---|
| 200,793 | Switzerland | Jan. 2, 1939 |
| 485,841 | France | Nov. 21, 1917 |
| 580,988 | France | Sept. 16, 1924 |